RECEIVER FOR REMOTE CONTROL IMPULSES

Filed Sept. 26, 1957 2 Sheets-Sheet 1

INVENTORS
HANS SCHMID
PAUL HAURI
BY
Morgan, Finnegan, Durham & Pine
ATTORNEYS.

INVENTORS
HANS SCHMID
PAUL HAURI
BY
Morgan, Finnegan, Durham & Pine
ATTORNEYS 3,025,496

RECEIVER FOR REMOTE CONTROL IMPULSES

Hans Schmid, Zurich, and Paul Hauri, Zug, Switzerland, assignors to Landis & Gyr A.G., Zug, Switzerland, a body corporate of Switzerland Filed Sept. 26, 1957, Ser. No. 686,347
Claims priority, application Switzerland Sept. 27, 1956
7 Claims. (Cl. 340—164)

The present invention relates to a novel and improved remote control, frequency-responsive, switching apparatus adapted for use with impulses transmitted over a power distribution network.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof illustrate two embodiments of the invention, and together with the description, serve to explain the principles of the invention.

As is known, central remote control installations serve to enable switching orders to be sent through an electrical energy distribution network to all load points of the network from a control station, either for changing over the tariffs of meters or for connecting and disconnecting loads, for example boilers, furnaces, street lighting, and the like, or again for controlling switches.

For this purpose, audio-frequency impulses are applied in known manner to the network by a transmitter at the control station and the points to be controlled comprise receivers which respond to predetermined orders and carry out the required switching operation. One common central remote control system is based on a time interval method, in which a series of order impulses is sequenced in time to a starter or indexing impulse. These order impulses are generally produced by a synchronous selector acting as a transmitter, which operates in known manner through an audio-frequency transmitting installation, on the energy transmission network to be controlled. The receivers generally include selectors which rotate synchronously with the mains frequency, the switching sequence of which has a controlled relationship with the switching sequence of the transmitter selector.

Figure 1:
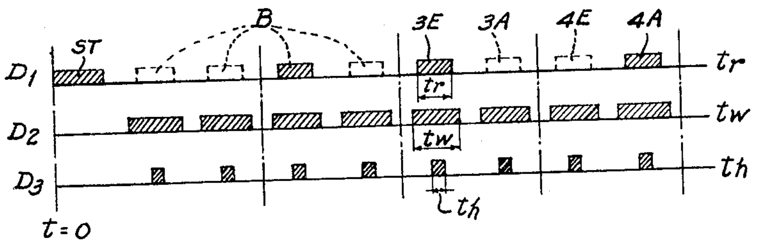
FIGURE 1 is an impulse diagram.

For a better understanding of the invention hereinafter to be described, an example of a known receiver will first be briefly explained with reference to FIGURES 1 and 2, in which the contact $h$ will initially be assumed to be closed.

The control impulses arriving at a receiver which is coupled to the transmission network Q are first processed by an input circuit EK selective at the control frequency. This input circuit EK may be a simple passive tank circuit, or it may be designed to form an amplifier. This input circuit generally acts on an impulse relay R, which closes contact $r$ to complete the energizing circuit of switching relays K in step wtih the incoming control impulses. Segments S are synchronously allocated to the impulses by means of the selector arm $w$ of a synchronous selector W, driven by a synchronous motor Sy, which is started with the aid of a cam N and its self-holding contact $u$. For example, when an order impulse arrives with the selector arm $w$ at the positon 3E, it energizes the corresponding coil of the change-over relay $K_3$, and the switch $k_3$ is thus transferred to contact E, whereby the load $L_3$ is connected. The change-over relay has two stable states. It changes state upon receipt of energizing current. The switching circuit 4 is drawn by way of example on the assumption that an order impulse arrives when the seelctor arm $w$ is at the position 4A.

It is clear that with the operation as just described the impulse relay contact $r$ must in some cases interrupt high switching currents at very high switching rates.

As is known, in the transmission of a particular order impulse for performing a single switching operation, for example 4A, all the remaining orders of the program cycle are generally also repeated at their respective positions of the synchronous selector notwithstanding these orders are redundant. Since the broadcast technique is largely characterized by statistical features, the method of repetition is fundamental, and it is not desired to abandon it.

However, this repetition, which causes the relay R to be actuated by every incoming impulse, involves numbers of switching operations of the impulse relay contact $r$ which run into millions over the years. The fact that this contact must operate with very particular reliability needs no emphasis.

Although the foregoing requirements suggest rugged construction, the impulse relay R is nevertheless often very sensitive, its contact inertia must not introduce excessive time delay and related problems and it must be actuated from a low power-level signal if complex and costly power amplification circuits are to be avoided. It is therefore of extremely great importance with regard to the useful life and the operating reliability of the impulse relay contact $r$ that it should be protected from unnecessary stresses and should be relieved of load as far as possible. More especially, it is desirable in this connection that the contact $r$ should not be closed while a voltage exists across its contacting points, and above all should not be opened while carrying current.

The present invention therefore provides a remote control receiver for remote control installations utilizing audio-frequency superimposed on the mains network, operating in accordance with the synchronous selector principle wherein order impulses sequenced in time to a starter impulse by a synchronous selector, actuate at least one switching relay through an input circuit selective at the control frequency and through an impulse relay associated wtih the said input circuit, characterized in that there is connected in series with an impulse relay contact of said impulse relay a controlled auxiliary contact which functions to produce a controlled time difference between the period of energization of said switching relay and the period of closure of said impulse relay contact.

Figure 2:
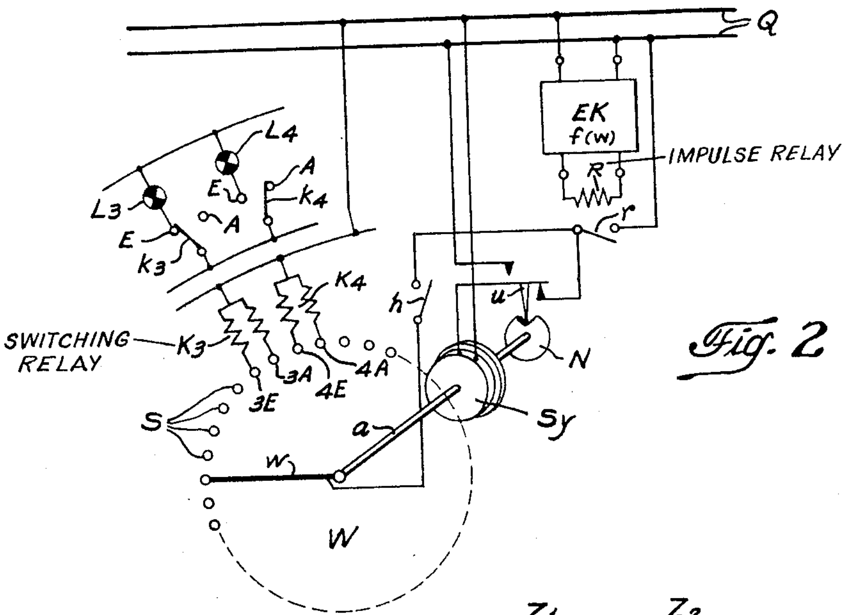
FIGURE 2 is a receiver shown schematically and with certain duplicate parts omitted.
Figure 3:
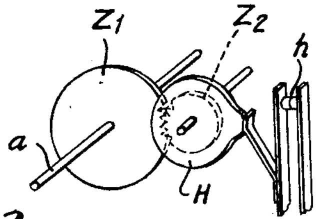
FIGURE 3 is a schematic detail view showing a contact control.

The principle of the operation of the receiver illustrated in FIGURE 2 has already been explained by way of introduction. In FIGURE 2, a contact $h$ is connected in series with the impulse relay contact $r$ and successively connected to the segments $s$ by the selector arm $w$. The switching relay coils K are directly connected to the segments. The auxiliary contact $h$ will be assumed by way of example to be controlled, as illustrated in FIGURE 3, by a cam H which is driven through two gearwheels $Z_1$, $Z_2$ by the synchronously driven shaft $a$ of the selector W.

FIGURE 1 shows, in the three impulse diagrams D1, D2 and D3, the closing times of the three series-connected contacts $r$, $w$–S and $h$ of the energizing current paths. The closing times $t_r$ of the impulse relay contact $r$ correspond substantially to the control impulses, i.e., to the starter impulse ST and to the succeeding order impulses B. It should be noted that as used hereinbefore, the terms "control impulses" and "order impulses" suggest actual current or voltage pulses. Nevertheless, the absence of a voltage or current during a switching period also constitutes an order. Thus, those impulses which are not hatched in D1 are not sent in the transmissions but do represent switching orders. The order impulse series B is combined to form so-called double orders, i.e., so-called on/off pairs (E/A), where for example actual "E" pulses energize and "A" pulses deenergize the load. The diagram D2 of FIGURE 1 shows the closing times $t_w$ of the selector arm $w$ passing over the segments S. For reasons of tolerance, the closing times $t_w$ are generally greater than the closing times $t_r$. The auxiliary contact $h$ is so controlled in accordance with FIGURE 3 that its closing times $t_h$ as illustrated in diagram D3 of FIGURE 1 are smaller than the closing times $t_r$ and consequently also smaller than the closing times $t_w$. Thus, the impulse relay contact $r$ opens and closes in the currentless state with the aid of the contact $h$ thus controlled. The actual switching-on and switching-off of currents are thus transferred to the contact $h$, which can be constructed in strong and robust form. A considerable advance in regard to the reliability of the impulse relay contact $r$ is thus achieved.

However, for each transmitted pulse there is current loading of the impulse relay contact $r$ during the period of closure $t_h$ of contact $h$.

Theoretically, the impulse relay contact $r$ could also be directly relieved of the switching-on and switching-off operations by a control of the contact closing time $t_w$ of the segments S. However, this method is inapplicable in practice because it is complicated, unreliable in operation and costly. The controlled auxiliary contact $h$ introduced in accordance with the invention, on the other hand, is an advantageous solution from the viewpoint of operating reliability and economy.

It is immaterial as far as the essence of the invention is concerned whether a switching relay K is allocated to each of the two states of a double order, as indicated in FIGURE 2, or whether a single switching relay K operates on a synchronously associated mechanical switching device.

A further embodiment of the subject of the invention which is of particular practical importance will be explained with reference to FIGURES 4–7. In these examples, the auxiliary contact $h$ is controlled by the switching relay K itself, in such manner that the auxiliary contact $h$ interrupts the energizing current path of the switching relay K after the switching relay K has been energized and before the impulse relay contact $r$ opens. Thus, the subsequent opening of the impulse relay contact $r$ occurs during the currentless state. This action is insured preferably by designing the switching relay K as a single-coil change-over relay, the auxiliary contact $h$ insuring readiness for switching to the alternate state by connecting the switching relay coil subsequent to the interrupting action described above, to the circuit which is energized in the alternate state.

Figure 5:
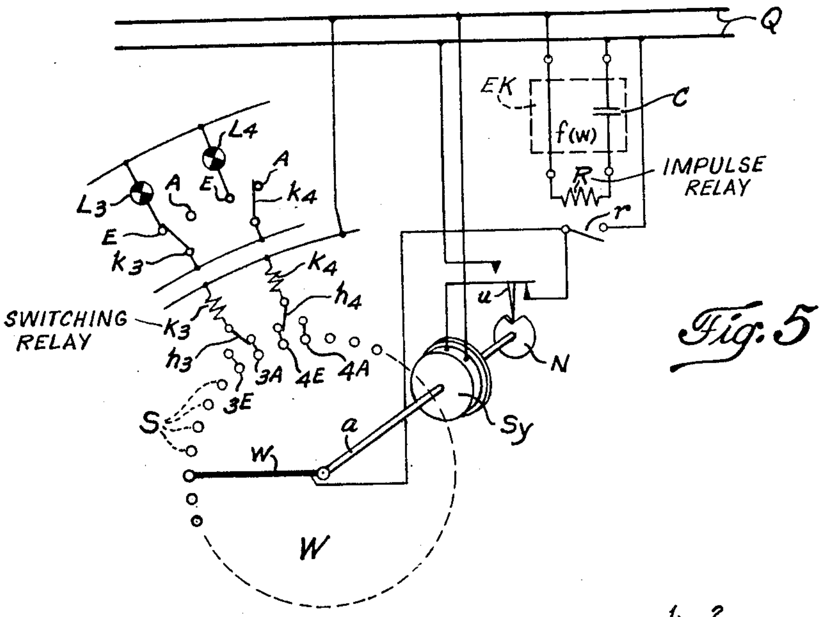
FIGURE 5 is a view showing a modified and preferred form of the receiver apparatus, also shown diagrammatically and with certain duplicate parts omitted.
Figure 6:
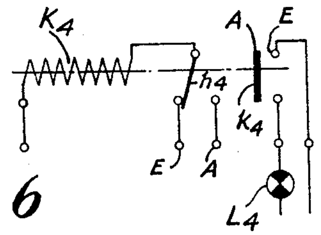
FIGURES 6 and 7 are detailed switching circuit diagrams of the switching relay.

The receiver of FIGURE 5 operates in principle similarly to that described with reference to FIGURE 2. The selective input circuit EK is here illustrated for the particularly simple case where it comprises only a condenser C which forms with the impulse relay R a series resonant circuit. The input circuit EK, however, may be constructed in other known manners.

Figure 7:
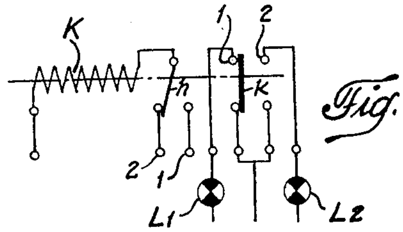

The impulse relay contact $r$ is closed, as shown by the diagram D5, in accordance with the transmitted impulses. For present purposes assume pulses are transmitted during the switching intervals 3A and 4E. Thus the contact $r$ is closed during these intervals. The closing times $t_w$ of the selector contacts are illustrated in diagram D6 of FIGURE 4. For example, when the impulses 3A and 4E arrive at the associated segments S of the selector W, and the auxiliary contacts $h_3$ and $h_4$ are in the positions 3A and 4E as illustrated in FIGURE 5, in accordance with diagram D5, the switch $k_3$ is set to A and the switch $k_4$ is set to E, while the auxiliary contacts $h_3$ and $h_4$ are changed over to E and A respectively by the same switching movements of the switching relays $K_3$, $K_4$, thereby placing said switching relays in readiness for transfer to the alternate state. Note that repetition of the impulses 3A and 4E will not affect the switching relays; no current will flow because the 3A and 4E paths are now open-circuited. The operation of the single-coil change-over relays will be apparent from FIGURE 6, which shows by way of example the case of the switching relay $K_4$ of FIGURE 5. FIGURE 7 shows the circuit arrangement of a relay based on the same principle, but in which the switch $k$ is designed as a change-over or transfer switch.

Figure 4:
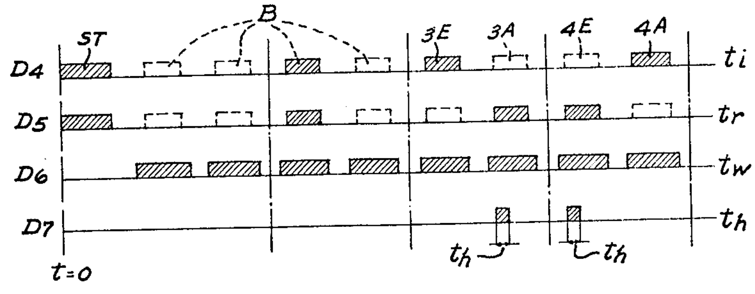
FIGURE 4 is a diagram showing the contact closing times in their relation to each other.

The diagram D7 of FIGURE 4 shows the transient closing times $t_h$ of the auxiliary contacts $h_3$, $h_4$ for the operation just described with reference to diagram D5, on arrival of the order impulses 3A and 4E. The associated diagrams show that the impulse relay contact $r$ closes under current, but that it opens in the no-current state owing to the change-over of the auxiliary contacts $h$.

As compared with the example described with reference to FIGURES 2 and 3, the solution last mentioned by way of example appears to be disadvantageous owing to the fact that the impulse relay contract $r$ is closed under current. This disadvantage is not very serious, because it is the switching-off operation which loads the contact more heavily. However, the method adopted in the example described with reference to FIGURES 4–7 affords an exceptional advantage which by far outweighs the disadvantage of contact-closing under current. This advantage resides in the fact that, as will readily be seen from FIGURE 5, no current can flow through the impulse relay contact $r$ during signal repetition at any given position, i.e. upon arrival of repetition impulses. Assume for example, in accordance with FIGURE 5, that the order 3E and the order 4A had been transmitted on the last program and are to be repeated as their related positions are reached by selector arm $w$. The impulses shown on diagram D4 of FIGURE 4 are then transmitted. After the first transmission of the order impulses 3E and 4A the switches $h_3$ and $h_4$ and $k_3$ and $k_4$ will be in the positions shown in FIGURE 5. Thus a repeat of the orders 3E and 4A will not cause currents to flow because the 3E and 4A paths are open-circuited. With this construction which, according to the invention, introduces into the energizing current path controlled auxiliary contacts in series with the impulse relay contact $r$, a current can flow only when a switch is changed over, i.e. the repetition of all the control program in any given circumstances can be carried out with the impulse relay contact $r$ in the no-current state. If it is borne in mind that generally it is desired to alter only one or a few orders in each revolution of the selector, while the existing repetition program is carried out for all the other orders during such revolution, and if it is borne in mind that many such program sequences are carried out per day, it will be apparent in view of the millions of switching operations taking place over the course of years that the impulse relay contact $r$ is relieved of considerable load by virtue of many currentless repetitions.

The invention in its broader aspects is not limited to the specific mechanism shown and described but departures may be made therefrom within the scope of the accompanying claims without departing from the principles of the invention and without sacrificing its chief advantages.

What is claimed is:

1. In a remotely controlled receiver responsive to a series of impulses superimposed on the mains network, said impulses having a predetermined audio frequency carrier component and comprising a starter impulse followed by a timed sequence of order impulses, said receiver comprising a frequency sensitive circuit responsive to said starter impulse and said order impulses, an impulse relay actuated by said frequency responsive circuit, a synchronous selector having a plurality of contacts, said selector allocatiing said order impulses in timed sequence to switching circuits, said selector being synchronized to the sequence of order impulses so that at least one of said switching circuits is operatively responsive to at least one of said order impulses, an energizing circuit for said switching circuit, said energizing circuit comprising contacts of said impulse relay, said contacts of said synchronous selector and auxiliary contacts, means responsive to the movement of said synchronous selector operating said auxiliary contacts to cause said auxiliary contacts to deenergize said impulse relay contacts during a period when said impulse relay contacts are changing from one state to another.

2. Remote control receiving apparatus according to claim 1 in which the means operating said auxiliary contacts are controlled by the synchronous selector such that said auxiliary contacts close later and open earlier than the impulse relay contacts so that the switching load of the receiver is carried by the auxiliary contacts.

3. Remote control receiving apparatus according to claim 1 in which said switching circuit includes a switching relay and in which the auxiliary contacts are controlled by said switching relay so that the auxiliary contacts interrupt the energizing current of the switching relay before the impulse relay contacts open.

4. Remote control apparatus according to claim 3 in which the switching relay is a single coil change-over relay having a plurality of stable states and where the auxiliary contacts, when actuated by actuation of the switching rely in one of said stable states, serve to reconnect the energizing circuit of said switching relay to permit its actuation by an impulse associated with an alternate state, said reconnection also serving to allow currentless operation of the impulse relay contacts when actuated by repetitive impulses.

5. Apparatus according to claim 1, in which said impulse relay contacts, said synchronous selector contacts and said auxiliary contacts are series-connected in said energizing circuit.

6. Apparatus according to claim 1, in which said means operating said auxiliary contacts comprise coupling means including a cam, said coupling means being actuated by said synchronous selector.

7. Apparatus according to claim 1, in which said means operating said auxiliary contacts comprise a switching relay energized by said energizing circuit, said switching relay also including contacts adapted to perform the switching functions ordered by said impulses.

References Cited in the file of this patent

UNITED STATES PATENTS

| | | |
|---|---|---|
| 2,203,358 | Koenig | June 4, 1940 |

FOREIGN PATENTS

| | | |
|---|---|---|
| 495,057 | Great Britain | Nov. 7, 1938 |
| 646,505 | Great Britain | Nov. 22, 1950 |
| 681,959 | Great Britain | Oct. 29, 1952 |